(12) United States Patent
Satou et al.

(10) Patent No.: US 9,378,725 B2
(45) Date of Patent: Jun. 28, 2016

(54) ULTRASONIC TRANSDUCER AND ULTRASONIC FLOW METER INCLUDING ULTRASONIC TRANSDUCER

(71) Applicant: Panasonic Intellectual Property Management Co., Ltd., Osaka-shi, Osaka (JP)

(72) Inventors: Masato Satou, Nara (JP); Hidetomo Nagahara, Kyoto (JP); Yuji Fujii, Nara (JP); Akihisa Adachi, Kyoto (JP); Aoi Watanabe, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 14/405,362

(22) PCT Filed: Jun. 5, 2013

(86) PCT No.: PCT/JP2013/003535
§ 371 (c)(1),
(2) Date: Dec. 3, 2014

(87) PCT Pub. No.: WO2013/183292
PCT Pub. Date: Dec. 12, 2013

(65) Prior Publication Data
US 2015/0128723 A1    May 14, 2015

(30) Foreign Application Priority Data
Jun. 5, 2012    (JP) .................. 2012-127766

(51) Int. Cl.
*G10K 11/18*    (2006.01)
*G01F 1/66*    (2006.01)
*B06B 1/06*    (2006.01)

(52) U.S. Cl.
CPC ............... *G10K 11/18* (2013.01); *B06B 1/067* (2013.01); *B06B 1/0685* (2013.01); *G01F 1/66* (2013.01); *G01F 1/662* (2013.01)

(58) Field of Classification Search
CPC .................................. G01F 1/66; G10K 11/18
USPC ................... 73/861.27; 310/334; 347/46
See application file for complete search history.

(56) References Cited

U.S. PATENT DOCUMENTS

| 4,011,473 A | 3/1977 | Massa |
| 7,161,280 B2 * | 1/2007 | Brun .................. G10K 9/22 310/323.21 |

(Continued)

FOREIGN PATENT DOCUMENTS

| EP | 0 420 190 A2 | 4/1991 |
| JP | 64-89894 A | 4/1989 |

(Continued)

OTHER PUBLICATIONS

International Search Report in corresponding International Application No. PCT/JP2013/003535, dated Aug. 20, 2013, 2 pages.

(Continued)

*Primary Examiner* — Jewel V Thompson
(74) *Attorney, Agent, or Firm* — Brinks Gilson & Lione

(57) ABSTRACT

An ultrasonic transducer comprises a metal plate; an acoustic matching member fastened to one of surfaces of the metal plate, a piezoelectric substrate which is fastened to the other surface of the metal plate and generates a vibration; and an insulating damping member covering a surface of the piezoelectric substrate which surface is on an opposite side of a surface fastened to the metal plate; wherein a thickness of the insulating damping member is set to a length which is n/2 of a wavelength of the vibration propagating through the insulating damping member.

10 Claims, 7 Drawing Sheets

(56) References Cited

U.S. PATENT DOCUMENTS

| | | | |
|---|---|---|---|
| 8,085,621 B2* | 12/2011 | Massa | B06B 1/0644 367/138 |
| 8,320,218 B2* | 11/2012 | Massa | G01F 1/662 367/140 |
| 9,175,994 B2* | 11/2015 | Ueberschlag | G01F 1/662 |
| 2004/0113523 A1 | 6/2004 | Hashimoto et al. | |

FOREIGN PATENT DOCUMENTS

| | | |
|---|---|---|
| JP | 9-307998 A | 11/1997 |
| JP | 10-224895 A | 8/1998 |
| JP | 2001-159551 A | 6/2001 |
| JP | 2002-336258 A | 11/2002 |
| JP | 2005-286701 A | 10/2005 |

OTHER PUBLICATIONS

Supplementary European Search Report in corresponding European Application No. EP 13 80 1304, dated Jun. 12, 2015, 6 pages.

\* cited by examiner

ULTRASONIC TRANSDUCER AND ULTRASONIC FLOW METER INCLUDING ULTRASONIC TRANSDUCER

This application is a 371 application of PCT/JP2013/003535 having an international filing date of Jun. 5, 2013, which claims priority to JP 2012-127766 filed Jun. 5, 2012, the entire contents of which are incorporated herein by reference.

TECHNICAL FIELD

The present invention relates to an ultrasonic transducer (transmitter/receiver) which transmits and receives an ultrasonic pulse, and an ultrasonic flow meter including the ultrasonic transducer.

BACKGROUND ART

Conventionally, it is known that a damping member (vibration suppression member) suppresses an undesired vibration in a piezoelectric element, in an ultrasonic transducer which transmits and receives an ultrasonic wave by using the piezoelectric element. For example, in an ultrasonic sensor 73 disclosed in Patent Literature 1, as shown in FIG. 7, an acoustic matching layer 71 is fastened to one of surfaces of a piezoelectric element 70. A tubular case 72 is fastened to the acoustic matching layer 71 so as to surround the piezoelectric element 70. An elastic resin 74 is filled in the tubular case 72 such that the piezoelectric element 70 is buried in the elastic resin 74.

CITATION LIST

Patent Literature

Patent Literature 1: Japanese-Laid Open Patent Application Publication No. Hei. 10-224895

SUMMARY OF THE INVENTION

Technical Problem

In the above described ultrasonic sensor 73, a mechanical vibration generated in the piezoelectric element 70 propagates (travels) to the acoustic matching layer 71 and is radiated as an ultrasonic wave from the acoustic matching layer 71. However, this mechanical vibration is also transmitted from the piezoelectric element 70 to the elastic resin 74 and propagates therethrough. Then, the mechanical vibration is reflected on the end surface of the elastic resin 74 and is amplified by interference, which causes a reverberant noise and a propagation noise to be generated. These noises cause the ultrasonic sensor 73 to become incapable of radiating the ultrasonic wave with a high accuracy.

The interference can be prevented by setting the thickness of the elastic resin 74 larger so that the reflected mechanical vibration is attenuated. However, in this case, the size of the ultrasonic sensor 73 increases.

The present invention is directed to solving the above described problem associated with the art, and an object of the present invention is to provide a small ultrasonic transducer which is capable of accurately radiating an ultrasonic pulse, and an ultrasonic flow meter including the ultrasonic transducer.

Solution To Problem

To solve the above mentioned problem, according to the present invention, there is provided an ultrasonic transducer comprising: a metal plate; an acoustic matching member fastened to one of surfaces of the metal plate, a piezoelectric substrate which is fastened to the other surface of the metal plate and generates a vibration; and an insulating damping member covering a back surface of the piezoelectric substrate which surface is on an opposite side of a surface fastened to the metal plate; wherein a thickness of the insulating damping member is set to a length which is n/2 of a wavelength of the vibration propagating through the insulating damping member.

Advantageous Effects of Invention

The present invention is configured as described above, and has advantages that it becomes possible to provide a small ultrasonic transducer which is capable of accurately radiating an ultrasonic pulse, and an ultrasonic flow meter including the small ultrasonic transducer.

The above and further objects, features, and advantages of the invention will more fully be apparent from the following detailed description with accompanying drawings.

DETAILED DESCRIPTION OF THE PREFERRED EMBODIMENTS

Figure 1:
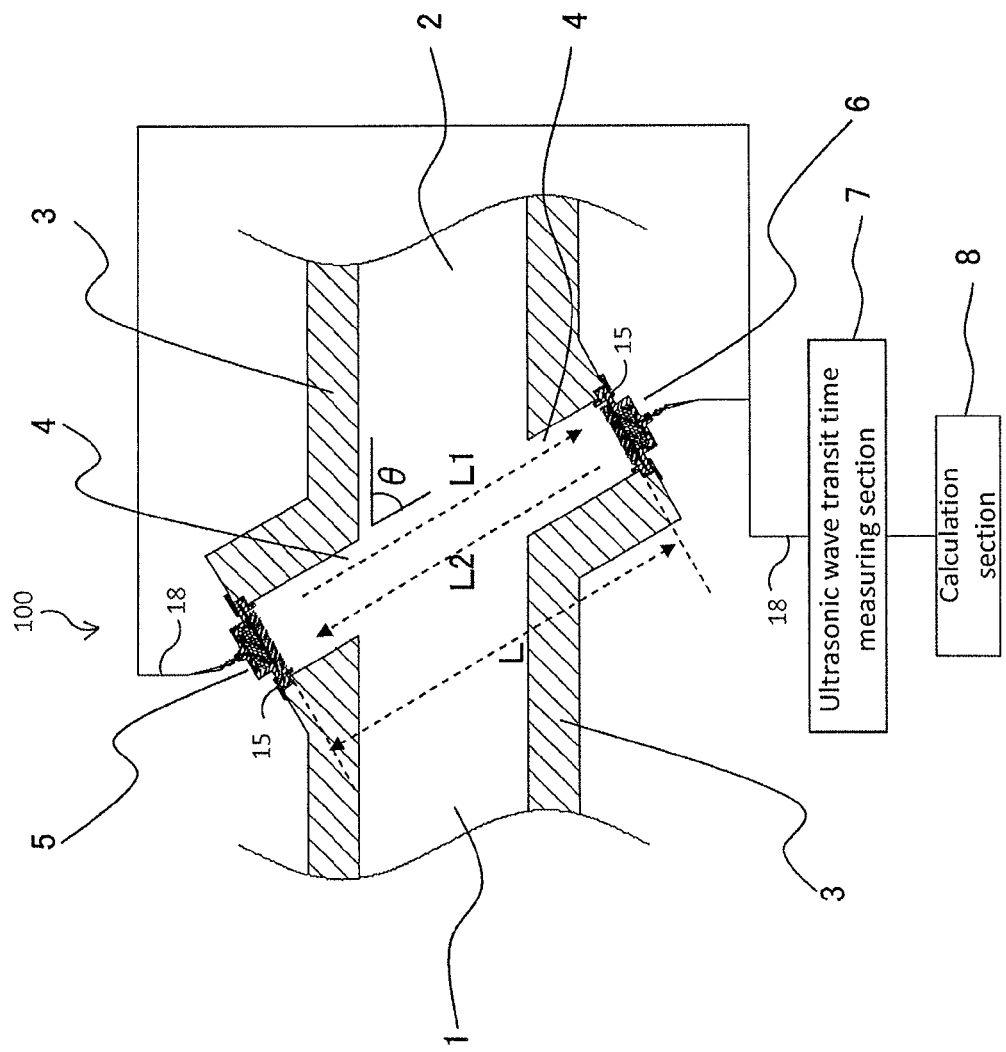
FIG. 1 is a cross-sectional view showing an ultrasonic flow meter according to Embodiment 1 of the present invention.

According to a first aspect of the present invention, there is provided an ultrasonic transducer comprising: a metal plate; an acoustic matching member fastened to one of surfaces of the metal plate, a piezoelectric substrate which is fastened to the other surface of the metal plate and generates a vibration; and an insulating damping member (insulating vibration suppression member) covering a back surface of the piezoelectric substrate which surface is on an opposite side of a surface fastened to the metal plate; wherein a thickness of the insulating damping member is set to a length which is n/2 of a wavelength of the vibration propagating through the insulating damping member.

According to a second aspect of the present invention, there is provided an ultrasonic transducer comprising: a metal plate; an acoustic matching member fastened to one of surfaces of the metal plate; a piezoelectric substrate which is fastened to the other surface of the metal plate and generates a vibration; an insulating damping member covering a back surface of the piezoelectric substrate which surface is on an opposite side of a surface fastened to the metal plate; and a support section which is in contact with a back surface of the insulating damping member which surface is on an opposite side of a surface covering the piezoelectric substrate, the support section having a higher density than the piezoelectric substrate; wherein a thickness of the insulating damping member is set to a length which is (2n−1)/4 of a wavelength of the vibration propagating through the insulating damping member.

According to a third aspect of the present invention, in the ultrasonic transducer according to the first or second aspect, the metal plate may have a flat plate shape.

According to a fourth aspect of the present invention, in the ultrasonic transducer according to the first or second aspect, the metal plate may have a flanged container shape including a tubular side wall, a top portion covering an opening at one end of the side wall, and a flanged portion protruding outward from the other end of the side wall; wherein the acoustic matching member may be fastened to one of surfaces of the top portion; the piezoelectric substrate may be fastened to the other surface of the top portion, in an inner space of the side wall; and the insulating damping member covers a surface of the piezoelectric substrate which surface is on an opposite side of a surface fastened to the top portion.

According to a fifth aspect of the present invention, in the ultrasonic transducer according to any one of the first to fourth aspects, the insulating damping member may unitarily cover the back surface of the piezoelectric substrate, a side surface of the piezoelectric substrate; and a portion of the metal plate which portion is other than a portion fastened to the acoustic matching member and a portion fastened to the piezoelectric substrate.

According to a sixth aspect of the present invention, there is provided an ultrasonic flow meter comprising: a pair of ultrasonic transducers according to any one of the first to fifth aspects, which mutually transmit and receive an ultrasonic pulse; a fluid passage member to which the pair of ultrasonic transducers are mounted such that the ultrasonic transducers are apart from each other; a transit time measuring section for measuring time for which the ultrasonic pulse propagates between the pair of ultrasonic transducers; and a calculation section for calculating a flow of a measurement target fluid based on the time measured by the transit time measuring section.

(Embodiment 1)
(Configuration of Ultrasonic Flow Meter)

FIG. 1 is a cross-sectional view schematically showing an ultrasonic flow meter 100 to which ultrasonic transducers 5, 6 are mounted. As shown in FIG. 1, the ultrasonic flow meter 100 is a device which measures the flow of a measurement target fluid flowing through a fluid passage, and mounted to a fluid passage member 3. The fluid passage member 3 is formed of, for example, a cylindrical pipe, and has an opening 1 at one end thereof and an opening 2 at the other end thereof. The inner space of the fluid passage member 3 is used as a fluid passage, which communicates with the opening 1 and the opening 2. The fluid passage member 3 also has an opening 4 at one side and an opening 4 at the other side which penetrate the pipe wall thereof. For example, each of the openings 4 protrudes outward relative to the fluid passage member 3 and has a cylindrical inner space. The opening 4 at one side is provided to be closer to the opening 1, while the opening 4 at the other side is provided to be closer to the opening 2 such that these openings 4 face each other. Because of this, the center axes of the openings 4 conform to each other and are inclined at an angle θ with respect to the center axis of the fluid passage member 3.

The pair of ultrasonic transducers 5, 6 are in contact with and fastened to the fluid passage member 3 in positions at which they mutually transmit and receive the ultrasonic pulse. That is, the ultrasonic transducer 5 is mounted to the opening 4 at one side, while the ultrasonic transducer 6 is mounted to the opening 4 at the other side. The pair of ultrasonic transducers 5, 6 are placed such that the acoustic matching members 15 face each other and the radiation surfaces of the acoustic matching members 15 are perpendicular to the center axes of the openings 4. In this structure, each of the pair of ultrasonic transducers 5, 6 transmits the ultrasonic pulse along the center axes of the openings 4, i.e., in an inclined direction at an angle θ with respect to the center axis of the fluid passage member 3. Also, each of the pair of ultrasonic transducers 5, 6 receives the ultrasonic pulse which enters the ultrasonic transducer 5, 6, along the center axes of the openings 4, i.e., in the inclined direction at the angle θ with respect to the fluid passage member 3.

An ultrasonic wave transit (propagation) time measuring section (hereinafter will be referred to as "transit time measuring section") 7, and a calculation section 8 are constituted by a controller such as a microcomputer. The microcomputer includes a processor section such as a CPU, and a storage section such as ROM and RAM. The transit time measuring section 7 and the calculation section 8 may be constituted by a single controller, or different controllers.

The transit time measuring section 7 measures time for which the ultrasonic pulse propagates (travels) between the pair of ultrasonic transducers 5, 6. The calculation section 8 calculates the flow of a measurement target fluid based on the time measured by the transit time measuring section 7.

(Configuration of Ultrasonic Transducer)

Figure 2:
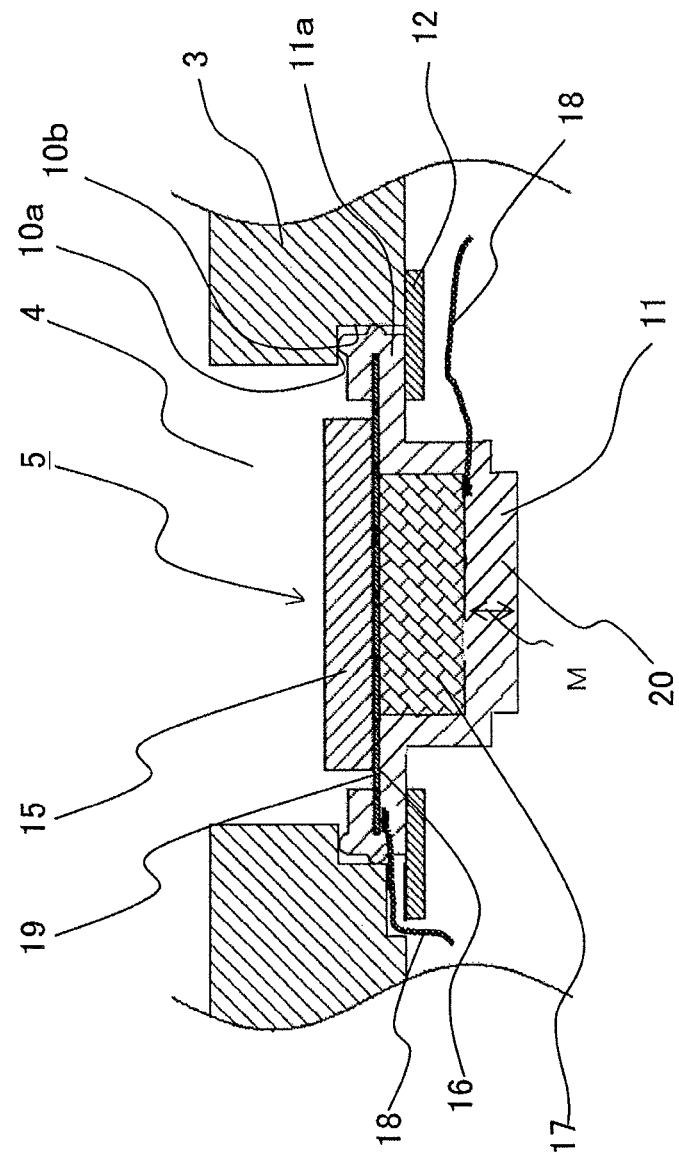
FIG. 2 is a cross-sectional view showing a state in which an ultrasonic transducer of the ultrasonic flow meter of FIG. 1 is mounted to a fluid passage member.

FIG. 2 is a cross-sectional view showing the ultrasonic transducer 5 according to Embodiment 1. Since the configuration of the ultrasonic transducer 6 is identical to that of the ultrasonic transducer 5, it will not be described. As shown in FIG. 2, the ultrasonic transducer 5 includes a piezoelectric substrate 17, an acoustic matching member 15, a metal plate 16, two lead wires 18, and an insulating damping member 11.

The piezoelectric substrate 17 is an element which is expanded and contracted in a thickness direction in response to a voltage applied thereto so that it converts an electric vibration into a mechanical vibration. The piezoelectric substrate 17 has a columnar shape such as a rectangular parallelepiped shape or a cylindrical shape. In the present embodiment, the piezoelectric substrate 17 has, for example, a rectangular parallelepiped shape of a short length. The piezoelectric substrate 17 includes a pair of electrodes, and a piezoelectric section sandwiched between these electrodes in the thickness direction. As the material of the piezoelectric section of the piezoelectric substrate 17, a material which exhibits a piezoelectric characteristic, for example, barium titanate, lead zirconate titanate, etc., are suitably used. One of the electrodes of the piezoelectric substrate 17 is joined to the metal plate 16 by an adhesive or an electrically conductive material such as a conductive paste. The other of the electrodes of the piezoelectric substrate 17 is joined to one of the lead wires 18 by an electrically conductive material such as a conductive paste or solder.

The acoustic matching member 15 is an element for matching an acoustic impedance of the piezoelectric substrate 17 with an acoustic impedance of the measurement target fluid to radiate as an ultrasonic pulse the mechanical vibration generated in the piezoelectric substrate 17 to the measurement target fluid. For example, the acoustic matching member 15 has a cylindrical shape. The thickness of the acoustic matching member 15 is set to, for example, a length of ¼ of a wavelength λ of the mechanical vibration propagating through the acoustic matching member 15. The acoustic matching member 15 is configured such that a thermoset resin is filled into spaces of hollow spherical glasses and cured, or a ceramic porous member is provided with an acoustic film on its sound wave radiation surface.

The metal plate 16 is a flat plate supporting the acoustic matching member 15 and the piezoelectric substrate 17. The metal plate 16 has, for example, a disc shape. The metal plate 16 is made of an electrically conductive material, for example, metal such as iron, stainless, brass, copper, aluminum, nickel-plated steel plate, etc. The acoustic matching member 15 is fastened to one of the main surfaces of the metal plate 16, while the piezoelectric substrate 17 is fastened to the other main surface of the metal plate 16. The metal plate 16 is greater in size than the acoustic matching member 15 and the piezoelectric substrate 17 in a direction perpendicular to the thickness direction. Because of this, the outer peripheral portion of the metal plate 16 protrudes from the acoustic matching member 15 and the piezoelectric substrate 17 in the direction perpendicular to the thickness direction of the acoustic matching member 15 and the piezoelectric substrate 17. The other lead wire 18 is connected to the other main surface of the outer peripheral portion by solder, or the like. The metal plate 16 is electrically connected to one of the electrodes of the piezoelectric substrate 17 by ohmic contact by means of an electrically conductive material. This allows one of the electrodes of the piezoelectric substrate 17 to be electrically connected to the other lead wire 18 via the metal plate 16.

One of the two lead wires 18 connects the other electrode of the piezoelectric substrate 17 to the transit time measuring section 7 (FIG. 1). The other lead wire 18 connects one of the electrodes of the piezoelectric substrate 17 to the transit time measuring section 7 via the metal plate 16. These are connected together, via the electrically conductive material such as solder or the conductive paste.

The insulating damping member 11 unitarily covers the outer peripheral portion of the metal plate 16, the outer surface of the piezoelectric substrate 17, and the two lead wires 18. The term "unitarily" means that the insulating damping member 11 is a single member formed of a continuous material. The outer peripheral portion of the metal plate 16 specifically includes a portion of the metal plate 16 which is other than the portion fastened to the acoustic matching member 15, and the portion fastened to the piezoelectric substrate 17. The outer surface of the piezoelectric substrate 17 specifically includes a surface (back surface) which is on an opposite side of the surface joined to the metal plate 16, and a side surface between the joined surface and the back surface. The thickness M of the insulating damping member 11 (back surface load section 20) covering the back surface of the piezoelectric substrate 17, is set to a length of ½ of the wavelength λ of the mechanical vibration propagating (travelling) through the insulating damping member 11. The back surface load section 20 may cover an entire or a part of the back surface of the piezoelectric substrate 17.

The insulating damping member 11 is formed of a thermoplastic resin which is low in glass transition point, for example, thermoplastic elastomer material or a crystalline polyester. As examples of the thermoplastic elastomer material, there are styrene elastomer, olefin elastomer, polyester elastomer, etc. The glass-transition point of the thermoplastic resin is preferably equal to or lower than, for example, −30 degrees C. which is a lowest temperature in the flow measurement of the measurement target fluid, for example, −50 degrees to −90 degrees. This allows the insulating damping member 11 to have a rubber elasticity and perform a vibration damping (suppressing) function during the flow measurement. Also, the melting point of the thermoplastic resin is preferably equal to or higher than 80 degrees C. which is a highest temperature in the flow measurement, for example, 100 to 200 degrees C. Young's modulus of the thermoplastic resin is, for example, 0.1 to 1.0 GPa, in a range of the lowest temperature to the highest temperature in the flow measurement. This allows the insulating damping member 11 to well absorb a vibration generated in the metal plate 16 and the piezoelectric substrate 17, during the flow measurement.

(Mounting of Ultrasonic Transducer)

As shown in FIG. 2, the ultrasonic transducer 5 is pressingly fastened to the fluid passage member 3 by means of an annular mounting member 12. In this state, the surface of the outer peripheral portion of the metal plate 16, which surface is closer to the acoustic matching member 15, contacts a contact surface 10*a* of the fluid passage member 3 via the insulating damping member 11. In addition, the end surface of the metal plate 16 contacts a contact surface 10*b* of the fluid passage member 3 via the insulating damping member 11. Furthermore, the surface of the outer peripheral portion of the metal plate 16 which surface is closer to the piezoelectric substrate 17 contacts the mounting member 12 via the insulating damping member 11. Therefore, the ultrasonic transducer 5 is fastened to fluid passage member 3 via the insulating damping member 11.

(Operation of Ultrasonic Flow Meter)

In a case where the ultrasonic transducer 5 transmits the ultrasonic pulse, as shown in FIGS. 1 and 2, the transit time measuring section 7 applies an electric (voltage) signal to the piezoelectric substrate 17 of the ultrasonic transducer 5 via the lead wire 18. This electric signal is formed by a square wave with a frequency which is close to a resonant frequency of the piezoelectric substrate 17. Therefore, the piezoelectric substrate 17 converts the electric signal into the mechanical vibration, and vibrates in the thickness direction. The mechanical vibration is applied from the piezoelectric substrate 17 to the acoustic matching member 15 via the metal plate 16. The acoustic matching member 15 resonates with the piezoelectric substrate 17. Thereby, the amplitude of the mechanical vibration is increased, and the mechanical vibration is radiated as the ultrasonic pulse from the radiation surface of the acoustic matching member 15.

As shown FIG. 1, the ultrasonic pulse radiated from the ultrasonic transducer 5 propagates through a path L1 and reaches the acoustic matching member 15 of the ultrasonic transducer 6. This ultrasonic pulse mechanically vibrates the piezoelectric substrate 17 via the acoustic matching member 15. Then, the piezoelectric substrate 17 converts this mechanical vibration into the electric signal and outputs the electric signal to the transit time measuring section 7. The transit time measuring section 7 derives transit (propagation) time t1 of the ultrasonic pulse based on a difference between time at which the electric signal is output to the piezoelectric substrate 17 of the ultrasonic transducer 5 and time at which the electric signal is input from the piezoelectric substrate 17 of the ultrasonic transducer 6.

Next, the ultrasonic pulse is transmitted from the ultrasonic transducer 6, propagates through a path L2, and is received by the ultrasonic transducer 5. Then, the transit time measuring section 7 derives transit (propagation) time t2 of the ultrasonic pulse based on a difference between time at which the electric signal is output to the piezoelectric substrate 17 of the ultrasonic transducer 6 and time at which the electric signal is input from the piezoelectric substrate 17 of the ultrasonic transducer 5. This case is similar to the above case where the ultrasonic transducer 5 transmits the ultrasonic pulse, and will not be described repeatedly. The order in which the ultrasonic pulse is transmitted may be reversed in such a way that the ultrasonic transducer 6 firstly transmits the ultrasonic pulse, and then the ultrasonic transducer 5 transmits the ultrasonic pulse.

Then, the calculation section 8 calculates the flow (rate) of the measurement target fluid based on the transit time t1 and the transit time t2 of the ultrasonic pulse which are found by the transit time measuring section 7. Specifically, in the fluid passage of the fluid passage member 3, the measurement target fluid flows at a flow velocity V from the opening 1 to the opening 2. The center axis of the opening 4 is inclined at the angle θ with respect to the center axis of fluid passage member 3. For this reason, the transit time t1 of the ultrasonic pulse propagating (travelling) through the path L1 at the speed C is different from the transit time t2 of the ultrasonic pulse propagating through the path L2 at the speed C. The distance of the path L1 and the path L2 is a distance L between the ultrasonic transducer 5 and the ultrasonic transducer 6. The angle θ is the angle formed between the direction in which the measurement target fluid flows (center axis of fluid passage member 3) and the direction in which the ultrasonic pulse propagates (center axis of the opening 4).

The transit time t1 of the ultrasonic pulse transmitted from the ultrasonic transducer 5 to the ultrasonic transducer 6 along the path L1 is represented by the following formula (1):

$$t1 = L/(C+V\cos\theta) \qquad (1)$$

The transit time t2 of the ultrasonic pulse transmitted from the ultrasonic transducer 6 to the ultrasonic transducer 5 along the path L2 is represented by the following formula (2):

$$t2 = L/(C-V\cos\theta) \qquad (2)$$

From the formula (1) and the formula (2), the flow velocity V of the measurement target fluid is derived, which is represented by the following formula (3):

$$V = L/2 \cos\theta(1/t1 - 1/t2) \qquad (3)$$

The distance L of the path L1 and the path L2 of the ultrasonic pulse and the angle θ formed between the direction in which the measurement target fluid flows and the direction in which the ultrasonic pulse propagates, are known. The transit time t1 and the transit time t2 of the ultrasonic pulse are measured by the transit time measuring section 7. From these, the calculation section 8 can derive the flow velocity V of the measurement target fluid based on the formula (3). Furthermore, the calculation section 8 can derive the flow Q, by multiplying the flow velocity V by a cross-sectional area S of the fluid passage member 3 and a compensation coefficient K.

(Function, Advantage)

As shown in FIG. 2, the mechanical vibration generated in the piezoelectric substrate 17 is transmitted to the acoustic matching member 15 via the metal plate 16, and radiated as the ultrasonic pulse from the radiation surface of the acoustic matching member 15. Concurrently, the mechanical vibration generated in the piezoelectric substrate 17 is transmitted to the back surface load section 20 and travels toward the surface (back surface of the back surface load section 20) which surface is on an opposite side of the surface joined to the piezoelectric substrate 17. Then, the mechanical vibration is reflected on the back surface of the back surface load section 20 and returned to the surface joined to the piezoelectric substrate 17.

When the reflected mechanical vibration reaches the surface joined to the piezoelectric substrate 17, a part of this mechanical vibration propagates (travels) to inside of the piezoelectric substrate 17. The remaining mechanical vibration is reflected again on the surface joined to the piezoelectric substrate 17, and propagates through the back surface load section 20 toward the back surface. If the mechanical vibration propagating through the back surface load section 20 toward the back surface interferes with the mechanical vibration travelling from the piezoelectric substrate 17 to the back surface load section 20, and its amplitude is increased, it would be difficult for an ultrasonic flow meter 100 to accurately measure the flow of the measurement target fluid.

Specifically, for example, if the piezoelectric substrate 17 or the like continues to vibrate due to the amplified mechanical vibration after the ultrasonic transducer 5 radiates the ultrasonic pulse, a reverberant noise may be generated. Because of this, when the ultrasonic transducer 5 radiates the ultrasonic pulse next, the reverberant noise affects the mechanical vibration propagating through the piezoelectric substrate 17 and/or the acoustic matching member 15. This may lead to a situation in which the ultrasonic transducer 5 cannot accurately radiate the mechanical vibration as the ultrasonic pulse.

If the mechanical vibration amplified at the ultrasonic transducer 5 propagates to the ultrasonic transducer 6 through the fluid passage member 3 and the like, a propagation noise may be generated. Because of this, when the ultrasonic transducer 6 radiates the ultrasonic pulse, the propagation noise affects the mechanical vibration propagating through the piezoelectric substrate 17 and/or the acoustic matching member 15. This may lead to a situation in which the ultrasonic transducer 6 cannot accurately radiate the mechanical vibration as the ultrasonic pulse.

The case where the ultrasonic transducer 5 transmits the ultrasonic pulse, and the ultrasonic transducer 6 receives this ultrasonic pulse has been described so far. The same occurs when the relation between the ultrasonic transducer 5 and the ultrasonic transducer 6 is reversed.

Figure 3:
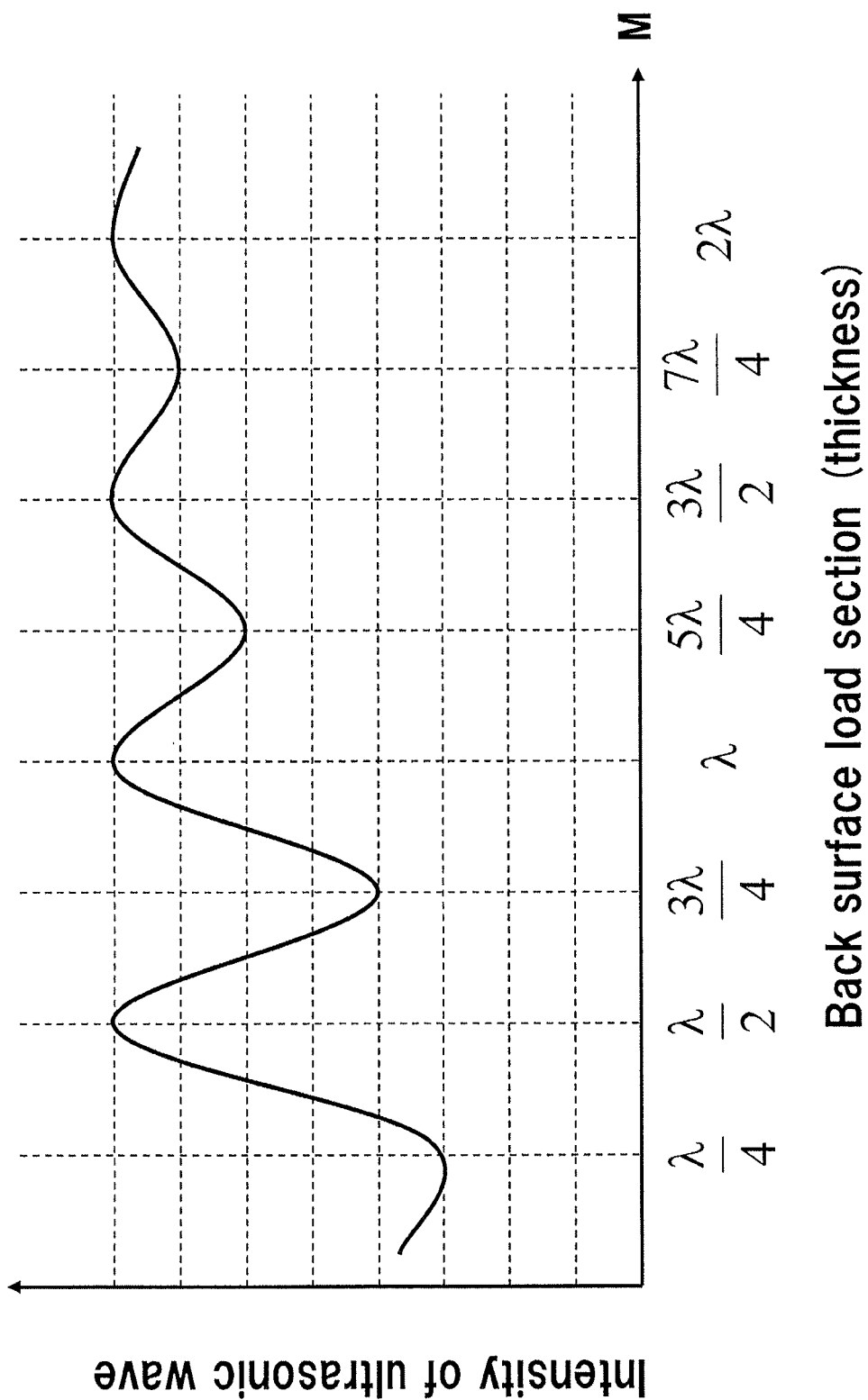
FIG. 3 is a graph schematically showing the relation between the thickness of a back surface load section of the ultrasonic transducer of FIG. 2 and the intensity of an ultrasonic wave.

Since the thickness M of the back surface load section 20 is set to λ/2, the effects which may be produced by the reverberant noise and the propagation noise can be suppressed. As a result, as shown in FIG. 3, without increasing the size of the ultrasonic transducers 5, 6, it becomes possible to prevent a reduction of the intensity of the ultrasonic pulse. FIG. 3 is a graph schematically showing the relationship between the back surface load section (thickness) and the intensity of the ultrasonic pulse. The back surface load section (thickness) indicates the thickness M of the back surface load section 20 of the ultrasonic transducer 5, 6. The intensity of the ultrasonic pulse indicates the magnitude of the ultrasonic pulse radiated from the ultrasonic transducer 5, 6.

Specifically, as shown in FIG. 2, the back surface load section 20 is placed such that its one of surfaces (surface joined to the piezoelectric substrate 17) is in contact with the piezoelectric substrate 17, and the other surface (back surface) is in contact with air. Therefore, the piezoelectric substrate 17, the back surface load section 20, and air are arranged in this order, and the density of these decreases in this order. Therefore, an acoustic impedance defined by a product of the density and the sound velocity decreases in this order, as well.

In the above relation of the acoustic impedance, the phase of the mechanical vibration (propagation vibration) propagating through the back surface load section 20 shifts by half-wave, when it is reflected on the surface joined to the piezoelectric substrate 17. On the other hand, the phase of the propagation vibration does not shift when it is reflected on the back surface of the back surface load section 20. Therefore, as can be seen from the following formula (12), the amplitude of the propagation vibration becomes smallest due to the interference, when the thickness M of the back surface load section 20 is an integral multiple of the half-wave ($\lambda/2$). In the formula (12), n indicates an integer and $\lambda$ indicates the wavelength of the mechanical vibration propagating through the back surface load section 20.

$$M = n \cdot \lambda/2 \quad \text{(formula 12)}$$

As can be seen from the formula (12), in a case where the thickness M of the back surface load section 20 is an integral multiple of the half-wave, the effects of the propagation vibration (reverberant noise and propagation noise) can be suppressed. Therefore, as shown in FIG. 3, it becomes possible to avoid a situation in which the intensity of the ultrasonic pulse radiated from the ultrasonic transducer 5, 6 is reduced due to the effect of the propagation vibration. In this way, the high intensity of the ultrasonic pulse can be ensured.

In particular, in the case of n=1 in the formula (12), the thickness M of the back surface load section 20 can be made smallest while reducing the magnitude of the mechanical vibration propagating through the back surface load section 20. From this, when the thickness M of the back surface load section 20 is $\lambda/2$, the size of the ultrasonic transducer 5, 6 can be reduced to a smallest one, and the high intensity of the ultrasonic pulse can be ensured.

Instead of $\lambda/2$, the thickness M of the back surface load section 20 may be set to a length which satisfies the formula (12). In this case, the thickness M is larger than that in the case of $\lambda/2$. Note that this thickness M is smaller than the thickness which allows the propagation vibration to be attenuated. This can reduce the size of the ultrasonic transducer 5, 6. Also, regarding the intensity of the ultrasonic pulse, the advantages which are similar to those in the case of $\lambda/2$, can be attained, when the thickness M of the back surface load section 20 is set to a length which is other than $\lambda/2$ and satisfies the formula (12).

In a case where the thickness M of the back surface load section 20 satisfies the formula (13) as illustrated below, the mechanical vibration (propagation vibration) which propagates through the back surface load section 20 is amplified due to the interference. Therefore, when the thickness M satisfies the formula (13), as shown in FIG. 3, the intensity of the ultrasonic pulse radiated from the ultrasonic transducer 5, 6 is reduced due to the propagation vibration. On the other hand, as the thickness M is increased, the propagation vibration is attenuated, and therefore the intensity of the ultrasonic pulse is increased as shown in FIG. 3. However, as the thickness M is increased, the size of the ultrasonic transducer 5, 6 is increased.

$$M = (2n-1)\lambda/4 \quad \text{(formula 13)}$$

In a case where the back surface load section 20 is capable of well attenuating the propagation vibration, the propagation vibration in the back surface load section 20 can be reduced, even when the thickness M of the back surface load section 20 is set smaller than $\lambda/2$. In this case, since the back surface load section 20 is thinned, the size of the ultrasonic transducer 5, 6 can be further reduced.

The insulating damping member 11 is unitarily formed over the metal plate 16 and the piezoelectric substrate 17. This can omit mounting of the insulating damping member 11. As a result, a productivity of the ultrasonic transducer 5, 6 is high.

Since the metal plate 16 is higher in dimension accuracy than a resin plate is, the ultrasonic transducer 5, 6 can be mounted to the fluid passage member 3 with a higher accuracy. This makes it possible to reduce a loss in transmission/reception of the ultrasonic pulse during the flow measurement. As a result, highly-accurate flow measurement can be implemented.

(Embodiment 2)

Figure 4:
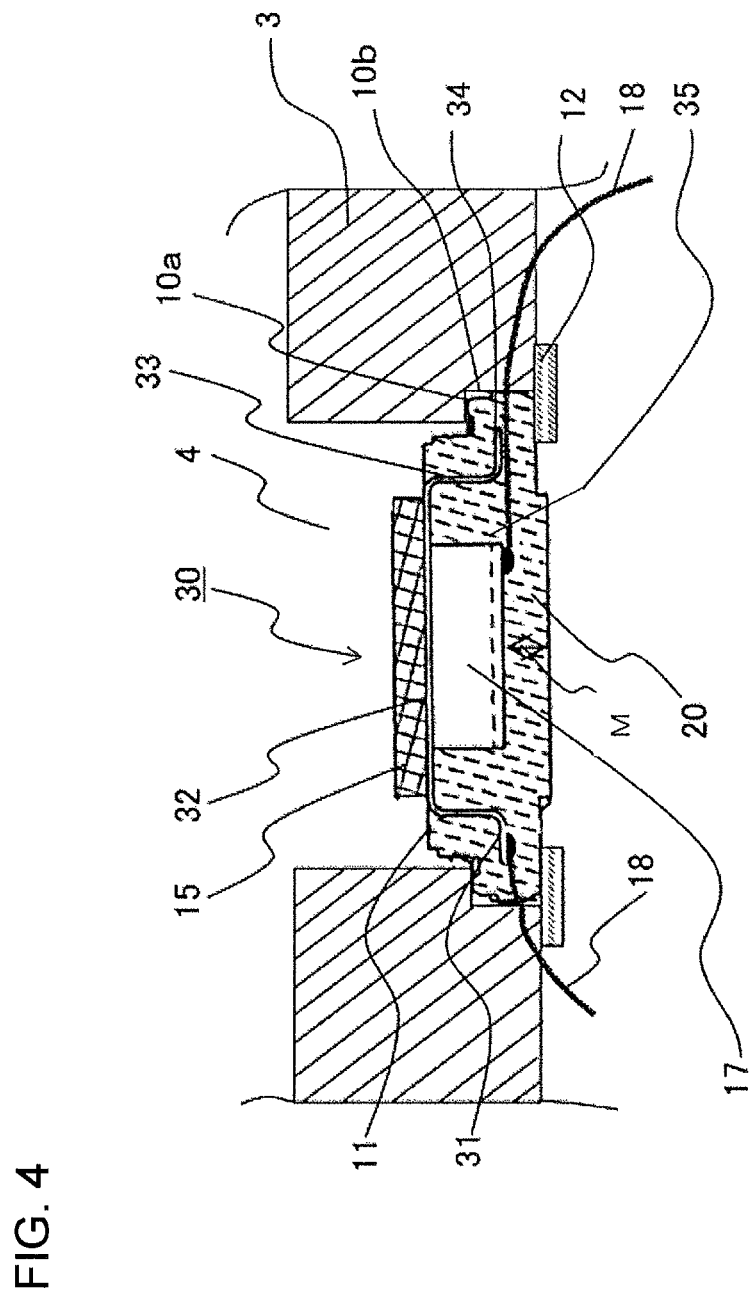
FIG. 4 is a cross-sectional view showing a state in which an ultrasonic transducer according to Embodiment 2 of the present invention is mounted to the fluid passage member.

Although the flat metal plate 16 is used in the ultrasonic transducer 5, 6 of Embodiment 1, a metal plate 31 of a flanged container shape is used as the metal plate in an ultrasonic transducer 30 of Embodiment 2. FIG. 4 is a cross-sectional view showing the ultrasonic transducer 30 according to Embodiment 2.

As shown in FIG. 4, the metal plate 31 has a flanged container shape, including a side wall 33, a top portion 32, and a flanged portion 34. The side wall 3 has a cylindrical shape. One end of the side wall 3 is connected to the top portion 32, while the other end thereof is connected to the flanged portion 34. The top portion 32 has a disc shape, and covers the opening at one end of the side wall 33. The flanged portion 34 has an annular shape, and extends radially outward from the side wall 33.

In the metal plate 31, the acoustic matching member 15 is fastened to the top surface of the top portion 32, and the piezoelectric substrate 17 is fastened to the back surface of the top portion 32. The inner diameter of the side wall 33 is greater than the length of the piezoelectric substrate 17. Therefore, the piezoelectric substrate 17 is located in the inner space of the tubular side wall 33, and a gap 35 is formed between the piezoelectric substrate 17 and the inner surface of the side wall 33.

The metal plate 31 may be manufactured by a deep-drawing process, using an electrically conductive material, for example, a metal material such as iron, stainless, brass, copper, aluminum, or nickel-plated steel plate. Because of this, the top portion 32 of the metal plate 31 is electrically connected to the electrode of the piezoelectric substrate 17 by ohmic contact using an electrically conductive material. The flanged portion 34 of the metal plate 31 is connected to the lead wire 18 by an electrically conductive material such as solder. This allows the electrode of the piezoelectric substrate 17 and the lead wire 18 to be electrically connected to each other via the metal plate 31.

The insulating damping member 11 unitarily covers the outer surface of the side wall 33 of the metal plate 31, the flanged portion 34 of the metal plate 31, the gap 35 formed between the piezoelectric substrate 17 and the inner surface of the side wall 33, the back surface of the piezoelectric substrate 17, and the two lead wires 18. The thickness M of the insulating damping member 11 (back surface load section 20) covering the back surface of the piezoelectric substrate 17, is set to a length of ½ of the wavelength $\lambda$ of the mechanical vibration generated in the piezoelectric substrate 17 and propagating through the insulating damping member 11. The back surface load section 20 may cover an entire or a part of the back surface of the piezoelectric substrate 17.

In the ultrasonic transducer 30 configured as described above, the acoustic matching member 15 is located closer to the opening 4, and the ultrasonic transducer 3 is pressingly fastened to the fluid passage member 3 by the annular mounting member 12. In this structure, the surface of the flanged portion 34 of the metal plate 31 which surface is closer to the acoustic matching member 15, is in contact with the contact surface 10*a* of the fluid passage member 3 via the insulating damping member 11. In addition, the end surface of the flanged portion 34 of the metal plate 31 is in contact with the contact surface 10*b* of the fluid passage member 3 via the insulating damping member 11. Furthermore, the surface of the flanged portion 34 of the metal plate 31, which surface is closer to the piezoelectric substrate 17, is in contact with the mounting member 12 via the insulating damping member 11. This allows each ultrasonic transducer 30 to be fastened to the fluid passage member 3 via the insulating damping member 11.

In accordance with the above described configuration, the thickness M of the back surface load section 20, is set to a length of ½ or n/2 of the wavelength λ of the mechanical vibration propagating through the back surface load section 20. Therefore, the same advantages as those of Embodiment 1 can be achieved.

(Embodiment 3)

Figure 5:
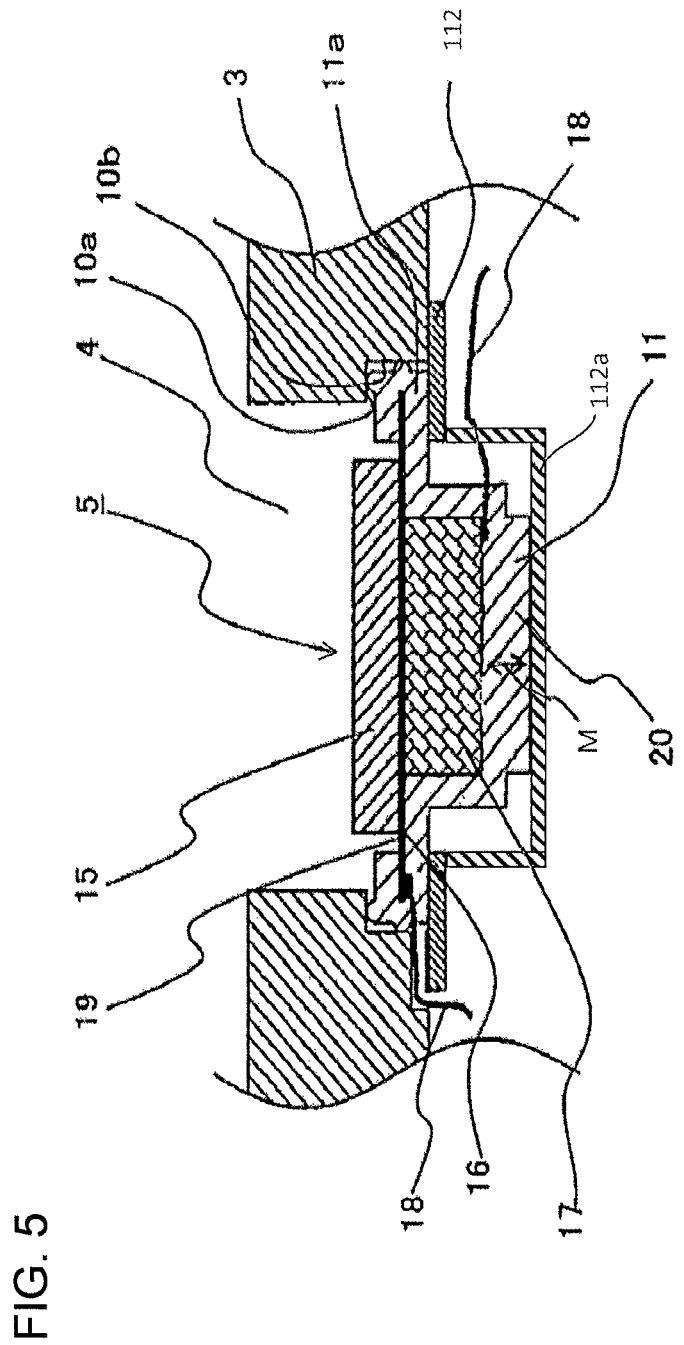
FIG. 5 is a cross-sectional view showing a state in which an ultrasonic transducer according to Embodiment 3 of the present invention is mounted to the fluid passage member.

In the ultrasonic transducer 5, 6 of Embodiment 1, the outer peripheral portion of the metal plate 16 is fastened by using the annular mounting member 12. In contrast, as shown in FIG. 5, in the ultrasonic transducer 5, 6 of Embodiment 3, the outer peripheral portion of the metal plate 16 and the piezoelectric substrate 17 are fastened by a mounting member 112 of a flanged container shape. FIG. 5 is a cross-sectional of the ultrasonic transducer 5 according to Embodiment 3. The configuration of the ultrasonic transducer 6 is similar to that of the ultrasonic transducer 5, and therefore will not be described repeatedly.

As shown in FIG. 5, the mounting member 112 has a flanged container shape including the outer peripheral portion, a support section 112a and a mounting section. The outer peripheral portion has a cross-section with a rectangular tube shape for the piezoelectric substrate 17 of a rectangular parallelepiped shape of a short length. The support section 112a has a rectangular flat plate shape for the piezoelectric substrate 17 of a rectangular parallelepiped shape of a short length, and covers the opening at one end of the outer peripheral portion. The mounting section has an annular shape, and extends radially outward from the other end of the outer peripheral portion. The mounting member 112 is formed of metal such as aluminum.

The mounting section of the mounting member 112 is mounted to the fluid passage member 3 in such a manner that the outer peripheral portion of the metal plate 16 of the ultrasonic transducer 5 is pressed onto the fluid passage member 3 by the mounting section of the mounting member 112. This allows the ultrasonic transducer 5 to be fastened to the fluid passage member 3. The inner surface of the support section 112a is in contact with the back surface of the back surface load section 20, and the support section 112a supports the piezoelectric substrate 17 via the back surface load section 20. This allows the support section 112a to protect the piezoelectric substrate 17.

In this case, the piezoelectric substrate 17, the back surface load section 20, and the support section 112a of the mounting member 112 are stacked together in this order. Since the piezoelectric substrate 17 and the support section 112a are higher in density than the back surface load section 20 is, the piezoelectric substrate 17 and the support section 112a are higher in acoustic impedance than the back surface load section 20 is.

In the above relation of the acoustic impedance, the phase of the mechanical vibration (propagation vibration) propagating through the back surface load section 20 shifts by half-wave, when it is reflected on the surface joined to the piezoelectric substrate 17, and when it is reflected on the back surface of the back surface load section 20. Therefore, when the following formula (14) is satisfied, the amplitude of the propagation vibration becomes smallest due to the interference. In the formula (14), n indicates an integer, and λ indicates the wavelength of the mechanical vibration propagating through the back surface load section 20.

$$M=(2n-1)\cdot\lambda/4 \qquad \text{(formula 14)}$$

In a case where the thickness M of the back surface load section 20 satisfies the formula (14), the effects of the propagation vibration (reverberant noise and propagation noise) can be suppressed. Therefore, it becomes possible to avoid a situation in which the intensity of the ultrasonic pulse radiated from the ultrasonic transducer 5, 6 is reduced due to the effect of the propagation vibration. In this way, the high intensity of the ultrasonic pulse can be ensured.

In particular, in the case of n=1 in the formula (14), the thickness M of the back surface load section 20 can be made smallest while reducing the magnitude of the mechanical vibration propagating through the back surface load section 20. From this, when the thickness M of the back surface load section 20 is λ/4, the size of the ultrasonic transducer 5, 6 can be reduced to a smallest one, and the high intensity of the ultrasonic pulse can be ensured.

Instead of λ/4, the thickness M of the back surface load section 20 may be set to a length which satisfies the formula (14). In this case, the thickness M is larger than that in the case of λ/4. Note that the thickness M is smaller than the thickness which allows the propagation vibration to be attenuated. This can reduce the size of the ultrasonic transducer 5, 6. Also, regarding the intensity of the ultrasonic pulse, the advantages which are similar to those in the case of λ/4, can be attained, when the thickness M of the back surface load section 20 is set to a length which is other than λ/4 and satisfies the formula (14).

In a case where the back surface load section 20 is capable of well attenuating the propagation vibration, the propagation vibration in the back surface load section 20 can be reduced, even when the thickness M of the back surface load section 20 is set smaller than λ/4. In this case, since the back surface load section 20 is thinned, the size of the ultrasonic transducer 5, 6 can be further reduced.

(Embodiment 4)

Figure 6:
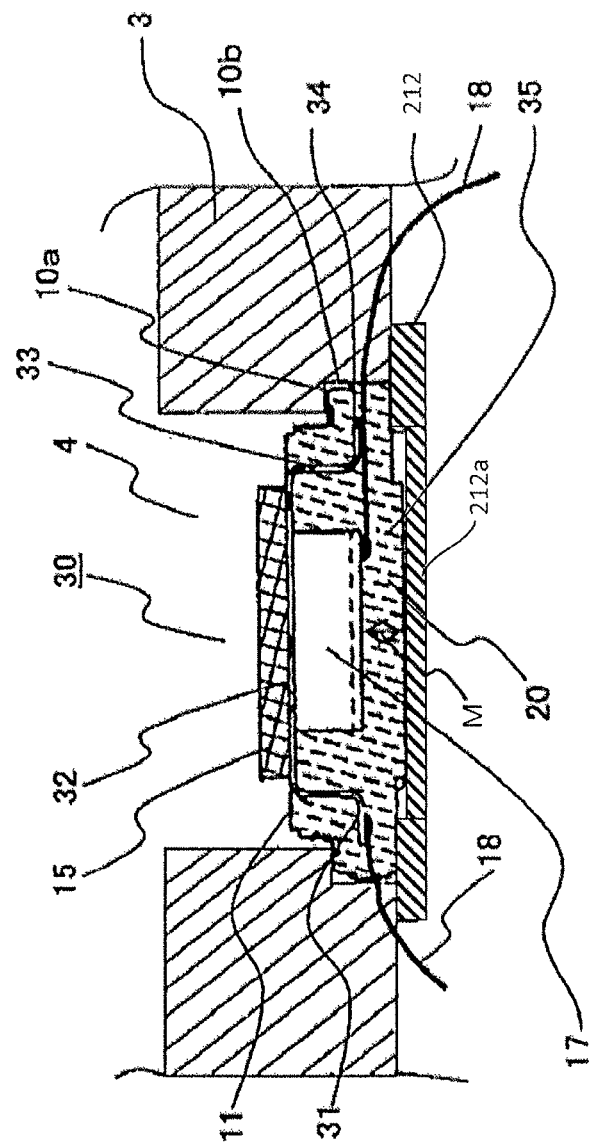
FIG. 6 is a cross-sectional view showing a state in which an ultrasonic transducer according to Embodiment 4 of the present invention is mounted to the fluid passage member.
Figure 7:
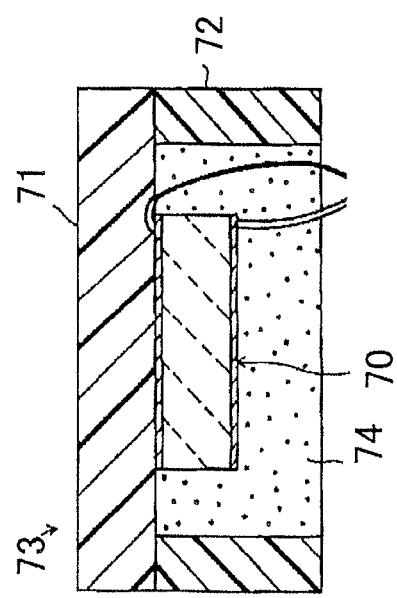
FIG. 7 is a cross-sectional view showing a conventional ultrasonic sensor.

In the ultrasonic transducer 30 of Embodiment 2, the flanged portion 34 of the metal plate 31 is fastened by the annular mounting member 12. In contrast, in the ultrasonic transducer 30 of Embodiment 4, as shown in FIG. 6, the flange portion 34 and the piezoelectric substrate 17 are fastened by using a flat plate mounting member 212. FIG. 6 is a cross-sectional view of the ultrasonic transducer 30 according to Embodiment 4.

As shown in FIG. 6, the mounting member 212 has a flat plate shape for covering the flanged portion 34 of the metal plate 31 and the piezoelectric substrate 17. In a case where the piezoelectric substrate 17 protrudes toward the back side farther than the flanged portion 34, the support section 212a of the mounting member 212 is recessed from the outer peripheral portion according to the amount of the protruding portion. The mounting member 112 is formed of metal such as aluminum.

The outer peripheral portion of the mounting member 212 is mounted to the fluid passage member 3 in such a manner that the flanged portion 34 of the metal plate 31 is pressed onto the fluid passage member 3. This allows the ultrasonic transducer 30 to be fastened to the fluid passage member 3. The surface of the support section 212a of the mounting member 212 is in contact with the back surface of the back surface load section 20, and the support section 212a supports the piezoelectric substrate 17 via the back surface load section 20. This allows the support section 212a to protect the piezoelectric substrate 17.

In this case, the piezoelectric substrate 17, the back surface load section 20, and the mounting member 212 are stacked together in this order. Since the piezoelectric substrate 17 and the mounting member 212 are higher in density than the back surface load section 20 is, the piezoelectric substrate 17 and the mounting member 212 are higher in acoustic impedance than the back surface load section 20 is.

As in the case of Embodiment 3, the propagation vibration is reflected on the surface of the back surface load section 20 which surface is joined to the piezoelectric substrate 17, and on the back surface of the back surface load section 20, while changing the phase. When the thickness M of the back surface load section 20 satisfies the formula (14), the propagation vibration in the back surface load section 20 becomes smallest, and the reverberant noise and the propagation noise can be reduced. This enables the ultrasonic transducer 30 to radiate the ultrasonic pulse with a high accuracy while suppressing the effects of the noise without increasing the size.

Instead of $\lambda/4$, the thickness M of the back surface load section 20 may be set to a length which satisfies the formula (14). In this case, the thickness M is larger than that in the case of $\lambda/4$. Note that the thickness M is smaller than the thickness which allows the propagation vibration to be attenuated. This can reduce the size of the ultrasonic transducer 5, 6. Also, regarding the intensity of the ultrasonic pulse, the advantages which are similar to those in the case of $\lambda/4$, can be attained, when the thickness M of the back surface load section 20 is set to a length which is other than $\lambda/4$ and satisfies the formula (14).

In a case where the back surface load section 20 is capable of well attenuating the propagation vibration, the propagation vibration in the back surface load section 20 can be reduced even when the thickness M of the back surface load section 20 is set smaller than $\lambda/4$. In this case, since the back surface load section 20 is thinned, the size of the ultrasonic transducer 30 can be further reduced.

The above described embodiments may be combined with each other so long as they do not exclude each other.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

An ultrasonic transducer and an ultrasonic flow meter including the ultrasonic transducer of the present invention are useful as a small-sized ultrasonic transducer which is capable of radiating an ultrasonic pulse with a higher accuracy than in a conventional example, an ultrasonic flow meter including the ultrasonic transducer, etc.

What is claimed is:
1. An ultrasonic transducer comprising:
a metal plate;
an acoustic matching member fastened to one of surfaces of the metal plate;
a piezoelectric substrate which is fastened to the other surface of the metal plate and generates a vibration; and
an insulating damping member covering a back surface of the piezoelectric substrate which surface is on an opposite side of a surface fastened to the metal plate;
wherein a thickness of the insulating damping member is set to a length which is n/2 of a wavelength of the vibration propagating through the insulating damping member.

2. An ultrasonic transducer comprising:
a metal plate;
an acoustic matching member fastened to one of surfaces of the metal plate;
a piezoelectric substrate which is fastened to the other surface of the metal plate and generates a vibration;
an insulating damping member covering a back surface of the piezoelectric substrate which surface is on an opposite side of a surface fastened to the metal plate; and
a support section which is in contact with a back surface of the insulating damping member which surface is on an opposite side of a surface covering the piezoelectric substrate, the support section having a higher density than the insulating damping member;
wherein a thickness of the insulating damping member is set to a length which is (2n−1)/4 of a wavelength of the vibration propagating through the insulating damping member.

3. The ultrasonic transducer according to claim 1, wherein the metal plate has a flat plate shape.

4. The ultrasonic transducer according to claim 1, wherein the metal plate has a flanged container shape including a tubular side wall, a top portion covering an opening at one end of the side wall, and a flanged portion protruding outward from the other end of the side wall;
wherein the acoustic matching member is fastened to one of surfaces of the top portion;
the piezoelectric substrate is fastened to the other surface of the top portion, in an inner space of the side wall; and
the insulating damping member covers a back surface of the piezoelectric substrate which surface is on an opposite side of a surface fastened to the top portion.

5. The ultrasonic transducer according to claim 1,
wherein the insulating damping member unitarily covers the back surface of the piezoelectric substrate, a side wall of the piezoelectric substrate, and a portion of the metal plate which portion is other than a portion fastened to the acoustic matching member and a portion fastened to the piezoelectric substrate.

6. An ultrasonic flow meter comprising:
the pair of ultrasonic transducers according to claim 1, which mutually transmit and receive an ultrasonic pulse;
a fluid passage member to which the pair of ultrasonic transducers are mounted such that the ultrasonic transducers are apart from each other;
a transit time measuring section for measuring time for which the ultrasonic pulse propagates between the pair of ultrasonic transducers; and
a calculation section for calculating a flow of a measurement target fluid based on the time measured by the transit time measuring section.

7. The ultrasonic transducer according to 2, wherein the metal plate has a flat plate shape.

8. The ultrasonic transducer according to 2, wherein the metal plate has a flanged container shape including a tubular side wall, a top portion covering an opening at one end of the side wall, and a flanged portion protruding outward from the other end of the side wall;
wherein the acoustic matching member is fastened to one of surfaces of the top portion;
the piezoelectric substrate is fastened to the other surface of the top portion, in an inner space of the side wall; and
the insulating damping member covers a back surface of the piezoelectric substrate which surface is on an opposite side of a surface fastened to the top portion.

9. The ultrasonic transducer according to 2, wherein the insulating damping member unitarily covers the back surface of the piezoelectric substrate, a side wall of the piezoelectric substrate, and a portion of the metal plate which portion is other than a portion fastened to the acoustic matching member and a portion fastened to the piezoelectric substrate.

10. An ultrasonic flow meter comprising:
- the pair of ultrasonic transducers according to claim 2, which mutually transmit and receive an ultrasonic pulse;
- a fluid passage member to which the pair of ultrasonic transducers are mounted such that the ultrasonic transducers are apart from each other;
- a transit time measuring section for measuring time for which the ultrasonic pulse propagates between the pair of ultrasonic transducers; and
- a calculation section for calculating a flow of a measurement target fluid based on the time measured by the transit time measuring section.

\* \* \* \* \*